US009645284B2

(12) United States Patent
Shin et al.

(10) Patent No.: US 9,645,284 B2
(45) Date of Patent: May 9, 2017

(54) APPARATUS FOR MEASURING PRECIPITATION

(71) Applicant: KOREA WATER RESOURCES CORPORATION, Daejeon (KR)

(72) Inventors: Ik Sang Shin, Daejeon (KR); Dong Seon Kim, Jeonbuk (KR); Kyung Woo Lee, Daejeon (KR)

(73) Assignee: KOREA WATER RESOURCES CORPORATION, Daejeon (KR)

( * ) Notice: Subject to any disclaimer, the term of this patent is extended or adjusted under 35 U.S.C. 154(b) by 259 days.

(21) Appl. No.: 14/356,003

(22) PCT Filed: Nov. 12, 2012

(86) PCT No.: PCT/KR2012/009510
§ 371 (c)(1),
(2) Date: May 2, 2014

(87) PCT Pub. No.: WO2013/077582
PCT Pub. Date: May 30, 2013

(65) Prior Publication Data
US 2014/0290353 A1    Oct. 2, 2014

(30) Foreign Application Priority Data

Nov. 25, 2011    (KR) .................. 10-2011-0124131

(51) Int. Cl.
*G01W 1/14*    (2006.01)
*G01W 1/00*    (2006.01)
(52) U.S. Cl.
CPC .................... *G01W 1/14* (2013.01)

(58) Field of Classification Search
CPC ........................................ G01W 1/14
USPC .................... 73/170.17, 19, 21, 23
See application file for complete search history.

(56) References Cited

U.S. PATENT DOCUMENTS 5,505,082 A * 4/1996 Cushman ............ G01W 1/14
73/170.21

FOREIGN PATENT DOCUMENTS

| JP | 56114781 A | * | 9/1981 |
| JP | 60263881 A | * | 12/1985 |
| KR | 20-0351474 Y1 | | 5/2004 |
| KR | 10-0947450 B1 | | 3/2010 |
| KR | 10-0957242 B1 | | 5/2010 |

(Continued)

*Primary Examiner* — Joseph S Wong
(74) *Attorney, Agent, or Firm* — Novick, Kim & Lee, PLLC; Jae Youn Kim

(57) ABSTRACT

Disclosed is a precipitation gauge including a precipitation receiving member having a water collecting part provided in a shape of a funnel at a lower portion of a cylindrical body and a drain tube, a photodetector installed on an inner sidewall of the cylindrical body to detect snow collected in the precipitation receiving member, heating parts installed on a bottom surface of the water collecting part and a wall of the drain tube to receive a snow signal detected by the photodetector for operation of the heating parts, a rotatable fluid supply unit coupled on a connection tube coupled with the drain tube of the precipitation receiving member perpendicularly to the drain tube, and a flow rate measuring unit provided in a discharge tube coupled with the connection tube provided at a lower portion of the rotatable fluid supply unit to measure a flow rate.

1 Claim, 4 Drawing Sheets

(56) References Cited

FOREIGN PATENT DOCUMENTS

KR     10-0997757 B1    12/2010
KR     10-1034954 B1     5/2011

\* cited by examiner

APPARATUS FOR MEASURING PRECIPITATION

BACKGROUND OF THE INVENTION

1. Field of the Invention

The present invention relates to a precipitation gauge. In more particular, the present invention a precipitation gauge in which a rotatable fluid supply unit and a flow rate measuring unit are provided under a precipitation receiving member in order to measure an amount of rain or snow collected in the precipitation receiving member, so that precipitation can be exactly measured, and the flow rate measuring unit can be individually separated, so that check, repair, and replacement works can be easily performed.

2. Description of the Related Art

In general, precipitation gauges are measuring units to measure an amount of rain or snow, and include tipping bucket type precipitation gauges, weighting type precipitation gauges, and float type precipitation gauges. Among them, the tipping bucket type gauge in a mechanical structure has been most extensively used around the world.

Regarding the tipping bucket type precipitation gauge, if rain or snow collected in a precipitation receiving member is dropped to a measuring cup and filled by a predetermined amount in the measuring cup, the measuring cup is inclined in one direction while the rain or the snow filled in the measuring cup is discharged to a water collecting container. Simultaneously, a magnetic switch is actuated so that pulses are generated. The above operation is performed by alternating left and right measuring cups and the precipitation is measured by counting the number of generated pulses.

However, according to the tipping bucket type precipitation gauge, in the process of tipping the rain or the snow in the measuring cup, friction is generated due to a mechanical operation to cause errors, and the precision in the measurement of precipitation is degraded due to the errors.

In addition, for the purpose of maintenance, correction, and check works, since complex equipment and a great amount of distilled water are carried to a field, manpower is significantly wasted, and long working time is required. As foreign substances such as insects or sands are collected in the gauge, the gauge may be failed.

Recently, about 2700 precipitation gauges are installed in Korea, and must be corrected every three years in compliance with the law of streams. In addition, since most precipitation gauges are installed in rough mountainous terrains, the maintenance of the gauge is difficult and manpower is wasted.

As a related art, there is provided Korea Utility Model Registration No. 20-0351474 titled "Non-Contact Precipitation Gauge". The non-contact precipitation gauge includes a precipitation receiving member having a funnel shape to collect precipitation, a quantified drain unit installed in a drain tube provided at a lower end of the precipitation receiving member to move up and down depending on precipitation so that water is drained in a constant amount through the drain tube, a water receiving member to measure the precipitation drained from the drain tube, optical interrupt devices serving as non-contact devices to generate pulses when the water receiving member is conducted, and drain ports to drain out water collected in the water receiving member after the precipitation has been measured.

However, in the above structure, since precipitation is measured after rain or snow has been collected in the measuring cup, rain or snow may remain in the measuring cup when a small amount of rain or snow falls or an amount of rain falling thereafter may be added to a previous precipitation and measured. In addition, the maintenance of the precipitation gauge is still difficult due to the characteristic of a mechanical device.

As another related art, there is provided Korea Patent Registration No. 10-0957242 titled "Precipitation Gauge". The precipitation gauge includes a precipitation receiving member to collect rain or snow, a measuring cup to contain the rain or the water discharged from the precipitation receiving member and inclined in one direction if the measuring cup is filled with a predetermined amount of rain or water, a pulse generator to generate pulses if the gauge is inclined, a heating part to transfer heat to at least a portion of the precipitation receiving member, a snow detecting part including a conductor electrically shorted through the snow collected in the precipitation receiving member in order to detect the snow, a controller to heat the heating part in order to melt the snow collected in the precipitation receiving member if the snow is detected by the snow detecting part.

The above technology is a measuring scheme based on the mechanical structure, and an error range resulting from the operation of the measuring cup still remains. The snow detecting part detects the snow by the temperature. However, if rain is fallen in the environment, such as winter, that the temperature is dropped, the snow detecting part recognizes the rain as snow to actuate the heating part.

On the contrary, when weather is warm so that a temperature is increased, even though the snow is collected in the precipitation receiving member, the heating part may not be operated.

SUMMARY OF THE INVENTION

The present invention is made keeping in mind the problems occurring in the related art, and an object of the present invention is to provide a precipitation gauge capable of minimizing errors when measuring the precipitation by removing a mechanical operating, part thereby improve the precision of the measurement.

Another object of the present invention is to simplify the structure of a precipitation gauge and detachably install a flow rate measuring unit, so that the convenience of maintenance and correction works can be improved.

Still another object of the present invention is to provide a precipitation gauge capable of effectively detecting snowfalls even if an external temperature is relatively high when snow falls, so that the precipitation can be measured.

According to the present invention, there is provided a precipitation gauge including a precipitation receiving member having a water collecting part provided in a shape of a funnel at a lower portion of a cylindrical body and a drain tube, a photodetector installed on an inner sidewall of the cylindrical body to detect snow collected in the precipitation receiving member, heating parts installed on a bottom surface of the water collecting part and a wall of the drain tube to receive a snow signal detected by the photodetector for operation of the heating parts, a rotatable fluid supply unit coupled on a connection tube coupled with the drain tube of the precipitation receiving member perpendicularly to the drain tube, and a flow rate measuring unit provided in a discharge tube coupled with the connection tube provided at a lower portion of the rotatable fluid supply unit to measure a flow rate.

The rotatable fluid supply unit is provided in a shape of a water wheel having a plurality of water troughs radially provided about a rotational shaft.

The discharge tube horizontally branches from the connection tube located at the lower portion of the rotatable fluid supply unit, and the flow rate measuring unit is installed at a downward-bent portion of the discharge tube, and provided at both sides thereof with coupling members so that the flow rate measuring unit is coupled with the discharge tube.

The connection tube is provided at a lower end portion thereof with a capturing part, and the capturing part is provided on a bottom surface thereof with a discharge cap to discharge foreign substances.

As described above, according to the precipitation gauge, the mechanical operating unit is omitted, so that the measurement errors resulting from friction can be minimized, the precipitation can be exactly measured even when a small amount of rain falls, and the failure rate can be reduced, so that the persisting period of a device can be increased.

In addition, not only can the structure of the precipitation gauge be simplified, but the flow rate measuring unit can be detachably installed, so that the convenience of maintenance and correction works can be improved.

In addition, the precipitation gauge can effectively detect snowfalls even if an external temperature is relatively high when snow falls, so that the precipitation can be measured. The capturing part is formed in the pipe to capture foreign substances introduced from the precipitation receiving member, so that only a flow rate be exactly measured.

DETAILED DESCRIPTION OF THE INVENTION

Figure 1:
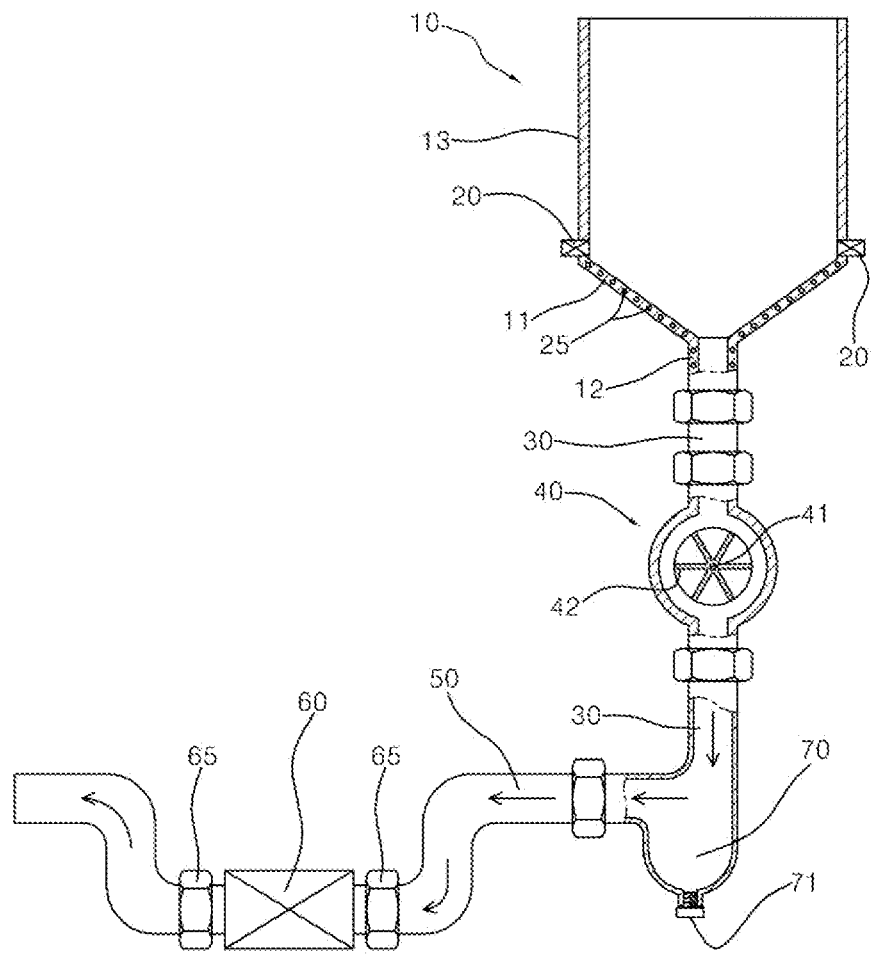
FIG. 1 is a front view showing the whole structure of a precipitation gauge according to the present invention.

A precipitation gauge according to the present invention includes a precipitation receiving member 10 having a water collecting part 11 provided in the shape of a funnel at a lower portion of a cylindrical body 13 and a drain tube 12, a photodetector 20 installed on an inner sidewall of the cylindrical body 13 to detect snow collected in the precipitation receiving member 10, heating parts 25 installed on the bottom surface of the water collecting part 11 and the wall of the drain tube 12 to receive a snow signal detected by the photodetector 20 for the operation of the heating parts 25, a rotatable fluid supply unit 40 coupled on a connection tube coupled with the drain tube 12 of the precipitation receiving member 10 perpendicularly to the drain tube 12, and a flow rate measuring unit 60 provided in a discharge tube 50 coupled with the connection tube 30 provided at a lower portion of the rotatable fluid supply unit 40 to measure a flow rate.

The rotatable fluid supply unit 40 is configured in the shape of a water wheel, and provided at the center thereof with a rotational shaft 41, and has a plurality of water troughs 42 radially provided about the rotational shaft 41.

The above structure is to prevent water from being dried in a pipe as the water flows for a long time when a small amount of rain or snow is collected in the precipitation receiving member 10. When a predetermined amount of fluid is filled into the water trough 42, the water trough 42 is rotated to supply the water downward.

The discharge tube 50 horizontally branches from the connection tube 30 located at a lower portion of the rotatable fluid supply unit 40. Accordingly, the above structure of the discharge tube 50 prevents errors from occurring in the gauge when a fluid is vertically dropped and allow a space for the installation of a foreign substance collection unit at a lower portion of the discharge tube 50.

The flow rate measuring unit 60 according to the present invention includes an electromagnetic flow meter or an ultrasonic flow meter generally known to those skilled in the art. The flow rate measuring unit 60 is installed at a downward-bent portion of the discharge tube 50 in such a manner that the flow rate measuring unit 60 is located lower than the discharge tube 50. Accordingly, air can be prevented from being introduced into the flow rate measuring unit 60, and water can be fully filled in the discharge tube 50 constantly, so that a flow rate can be exactly measured.

In addition, coupling members 65 are provided at both sides of the flow rate measuring unit 60 according to the present invention. According to a tipping bucket type precipitation gauge of the related art, a fluid to be tested is directly carried into an installation filed of the tipping bucket type precipitation gauge through manpower for the purpose of the correction and maintenance thereof, so that the fluid is measured, tested, and corrected in the field. However, since the flow rate measuring unit 60 according to the present invention has a structure separable from the discharge tube 50, a flow meter, which is previously subject to a laboratory test and laboratory correction, may be carried to the field and instantly replaced with new one, so that the working process and the manpower waste can be remarkably reduced.

A space is defined downward in a lower end portion of the connection tube 300. In other words, the space is provided therein with a capturing part 70 located lower than the height of the discharge tube 50. Accordingly, insects introduced from the precipitation receiving member 10, or foreign substances, such as sands mixed with rain or snow, are deposited into the lower portion of the capturing part 70, thereby preventing the foreign substances from being moved in the direction of the discharge tube 50, so that only a flow rate can be exactly measured. The deposited foreign substances may be discharged to the outside by opening a discharge cap 71 according to the present invention 71.

The flow rate measuring unit 60, which is installed at the downward-bent discharge tube 50, and the capturing part 70 are fully filled with water under normal conditions. If rain or snow is introduced, since the rain or the snow flows through the flow rate measuring unit 60 by an introduced amount due to the differential head, errors do not occur when the flow rate of the rain or the snow is measured.

Hereinafter, the operating process of a precipitation gauge according to the present invention will be described.

Figure 2:
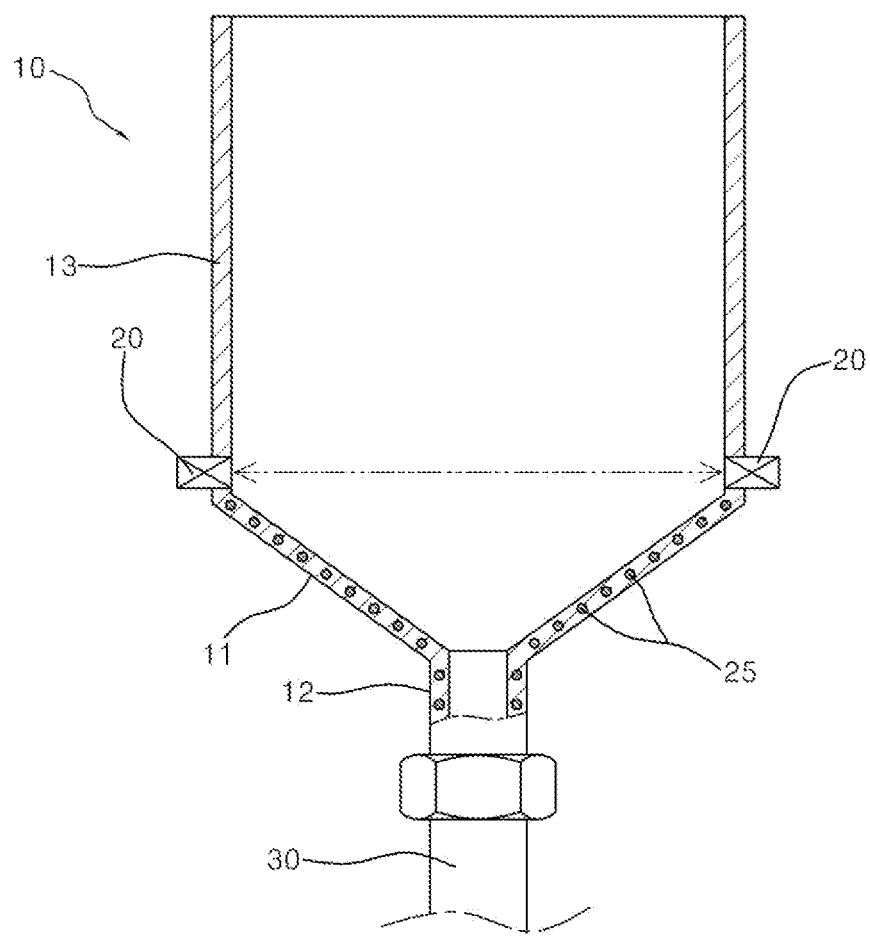
FIG. 2 is an enlarged sectional view showing a precipitation receiving member provided in the precipitation gauge according to the present invention.
Figure 3:
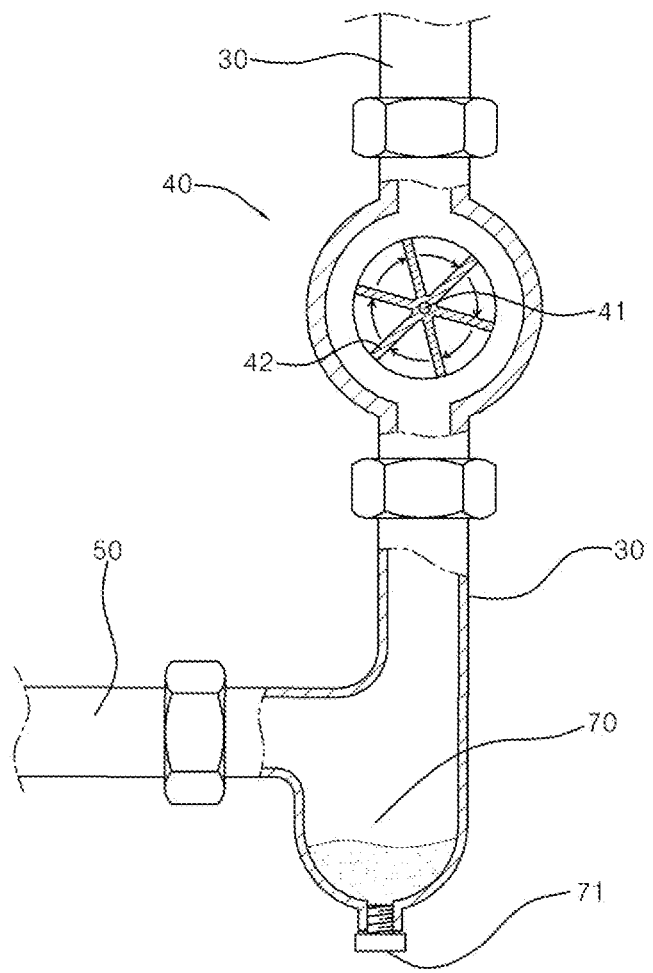
FIG. 3 is an enlarged sectional view showing a rotatable fluid supply unit and a collecting part provided in the precipitation gauge according to the present invention.

As shown in FIG. 2, in the precipitation receiving member of the precipitation gauge according to the present invention, rainwater flows into the drain tube 12 provided at the lower portion of the water collecting part 11 having the funnel shape provided at the lower portion of the cylindrical body 13, the photodetector 20 is installed on the inner sidewall of the precipitation receiving member 10, and the heating parts 25 having a coil-type tubular structure are provided in the walls of the water collecting part 11 and the drain tube 12. When rain falls, a fluid is guided to the flow rate measuring unit 50 through the fluid supply unit 40 so that a flow rate is measured. When snow falls, the photodetector 20 detects snow collected in the precipitation receiving member 10 and actuates the heating part 25 to melt the snow. Thereafter, the fluid is guided to the flow rate measuring unit 50 through the fluid supply unit 40 so that a flow rate is measured.

Figure 4:
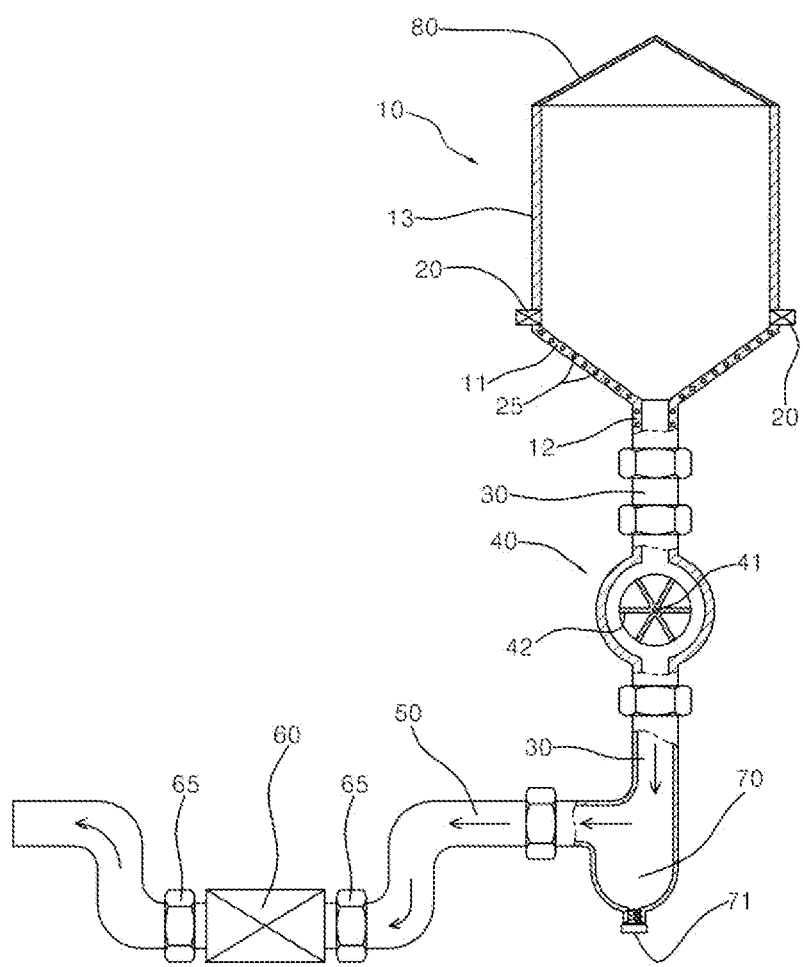
FIG. 4 is a front view showing the state that a shielding network is installed at the upper portion of the precipitation receiving member provided in the precipitation gauge according to the present invention.

According to the present invention, as shown in FIG. 4, a shielding network 80 in a conical shape is installed at the upper portion of the precipitation receiving member 10 to prevent foreign substances, such as fallen leaves, from being introduced into the precipitation receiving member 100, so that a flow rate can be conveniently and exactly measured.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A precipitation gauge comprising:
a precipitation receiving member having a water collecting part disposed in a shape of a funnel at a lower portion of a cylindrical body and a drain tube;
a photodetector installed on an inner sidewall of the cylindrical body to detect snow collected in the precipitation receiving member;
heating parts installed on a bottom surface of the water collecting part and a wall of the drain tube to receive a snow signal detected by the photodetector for operation of the heating parts;
a rotatable fluid supply unit coupled on a connection tube coupled with the drain tube of the precipitation receiving member; and
a flow rate measuring unit disposed in a discharge tube coupled with the connection tube coupled with the rotatable fluid supply unit to measure a flow rate, wherein the connection tube includes a capturing part disposed at a lower end portion thereof, and the capturing part includes a discharge cap disposed on a bottom surface thereof to discharge foreign substances.

* * * * *